Sheet 1 - 2 Sheets
C. R. Soule.
Revolving Rake.
N° 1791
32795
Patented Jul. 9, 1861
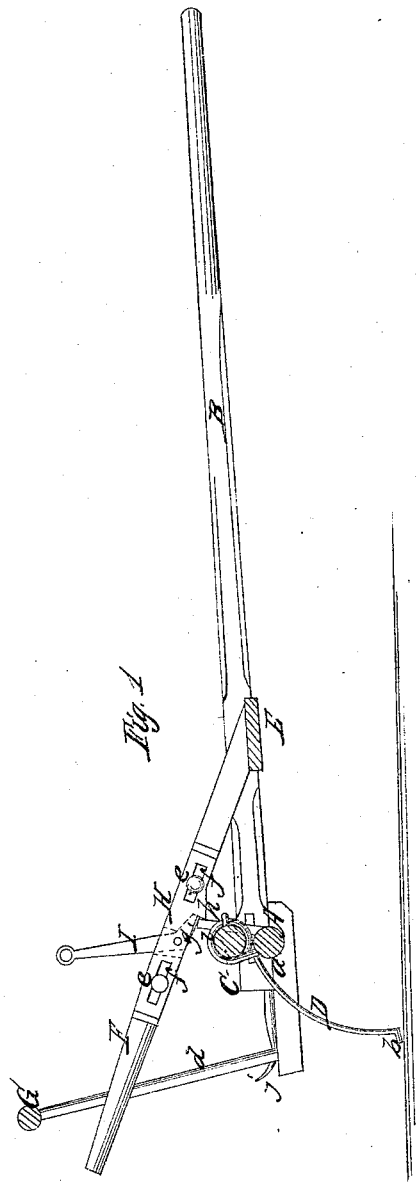
Witnesses.
R. S. Spruin
J. W. Cooney
Inventor.
Chas. R. Soule
per Munn
Attorneys

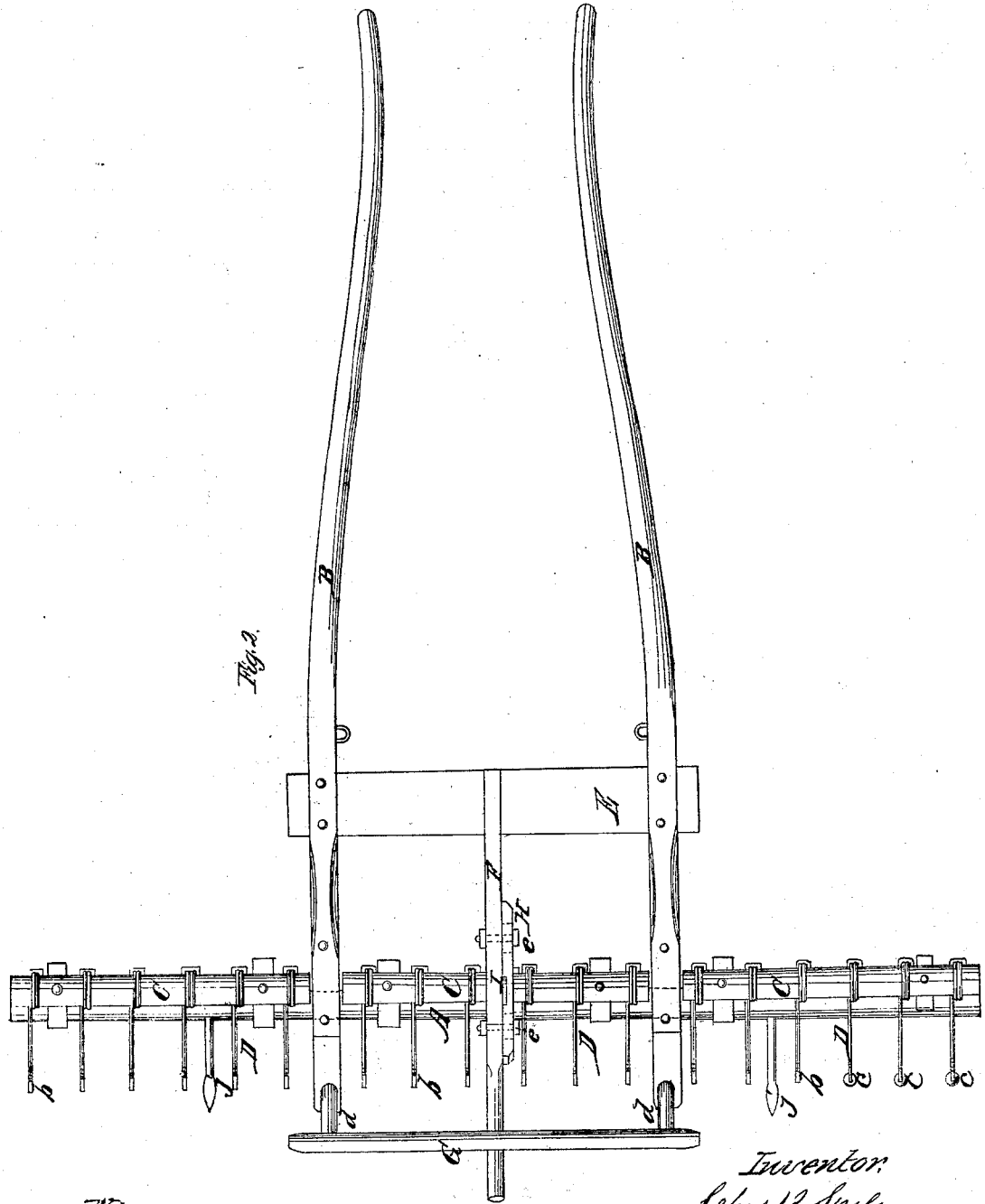

UNITED STATES PATENT OFFICE.

CHARLES R. SOULE, OF FAIRFIELD, VERMONT.

HAY-RAKE.

Specification of Letters Patent No. 32,795, dated July 9, 1861.

*To all whom it may concern:*

Be it known that I, CHARLES R. SOULE, of Fairfield, in the county of Franklin and State of Vermont, have invented a new and Improved Horse-Rake; and I do hereby declare that the following is a full, clear, and exact description of the same, reference being had to the annexed drawings, making a part of this specification, in which—

Figure 1, is a side sectional view of my invention; Fig. 2, a plan or top view of the same.

Similar letters of reference indicate corresponding parts in the two figures.

To enable those skilled in the art to fully understand and construct my invention I will proceed to describe it.

A represents a shaft which has its bearings $a$, in the back part of a pair of thills B, B, the shaft projecting at equal distances from each side of the thills as shown clearly in Fig. 3. The shaft A, is allowed to turn freely in its bearings and to it there are attached cylindrical bars C, which form the rake head. To the bars C, the wire teeth D, are attached in the usual or in any proper way. The teeth D, are of the usual form with the exception of their lower ends $b$, which are bent backward to about a horizontal position, said horizontal portions being about two inches in length. These horizontal portions, or terminals $b$, prevent the teeth D, catching into the ground and allow them to glide easily over it and perform their work equally as well as the ordinary ones. In order however that the teeth D, may operate effectually it is essential that the portions $b$, be not too high. Said portions should extend just below the top of the stubble. If they do not extend as low as this they would be liable to slide over the cut grass or hay. An equivalent of the bent terminals might be used in the form of balls or knobs $c$, as shown on three of the teeth in Fig. 2. These probably would not be so desirable as the bent terminals but they would undoubtedly effect the same result so far as the action of the teeth on the ground is concerned.

E, represents a cross piece on the thills B, B, and F, is a rod or bar attached to said cross piece and extending back in an oblique position as shown clearly in Fig. 1.

G is a handle which is attached to uprights $d$, $d$, at the back part of the thills.

To one side of the rod or bar F, a metal plate H, is attached. This plate H, is attached to the rod or bar F, by screw bolts $e$, $e$, which pass through oblong slots $f$, in the plate and through the rod or bar F, and admit of the longitudinal adjustment of the plate on the rod or bar a distance equal to the length of the slots less the thickness of the bolts. To the inner side of the plate H, there is attached by a fulcrum pin $g$, a bent lever I, the form of which is shown clearly in Fig. 1, and a projecting arm $i$, in the head C, catches against the shoulder $h$, and retains the rake in working position as it is drawn along, the arm $i$, being directly underneath the bent lever I.

The shaft A, has the usual spurs $j$, attached to assist its turning, when discharging its contents or load. The rake teeth are retained in working position in consequence of the arm $i$, bearing against the shoulder $h$, and a greater or less pitch or inclination may be given the rake teeth by adjusting the plate H, farther in or out on the rod or bar F.

The rake it will of course be seen is liberated by throwing forward the upper end of lever I, and thereby causing the lower end to bear on the end of arm $i$, which throws the rod or bar F, up until the shoulder $h$, is free from the arm $i$, the rake then revolves and discharges its load as usual.

Having thus described my invention what I claim as new and desire to secure by Letters Patent is:

1. In rakes that are supported upon their teeth, having the extremities of the teeth made or bent, substantially as herein shown and described so as to form an enlarged bearing surface and prevent the teeth from digging into the ground, all as set forth.

2. The movable or adjustable plate H, having the shoulder or catch $h$, at its under side, in connection with the lever I, and arm $i$ or their equivalents attached respectively to the plate and shaft to admit of the adjustment of the rake teeth D, to a greater or less pitch or inclination as may be required and the facile liberation of the rake to admit of its revolving as set forth.

CHARLES R. SOULE.

Witnesses:
ADALIZA SHERMAN,
GINEVRA A. PERLEY.